United States Patent
Ganille et al.

(10) Patent No.: US 11,762,837 B2
(45) Date of Patent: Sep. 19, 2023

(54) METHOD AND APPARATUS FOR UPDATING AND SHARING AN OBSTACLE DATABASE FOR AIRCRAFT

(71) Applicant: THALES, Courbevoie (FR)

(72) Inventors: Thierry Ganille, Merignac (FR); François Leullier, Merignac (FR); Patrice Colzato, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/845,943

(22) Filed: Jun. 21, 2022

(65) Prior Publication Data

US 2022/0414083 A1    Dec. 29, 2022

(30) Foreign Application Priority Data

Jun. 24, 2021    (FR) .................................... 2106771

(51) Int. Cl.
*G06F 16/00* (2019.01)
*G06F 16/23* (2019.01)
*G06F 16/25* (2019.01)

(52) U.S. Cl.
CPC ........ *G06F 16/2358* (2019.01); *G06F 16/252* (2019.01)

(58) Field of Classification Search
CPC .............................. G06F 16/2358; G06F 16/252
See application file for complete search history.

(56) References Cited

U.S. PATENT DOCUMENTS

| | | | |
|---|---|---|---|
| 8,862,381 B1 * | 10/2014 | Ridl | G08G 5/0013 701/3 |
| 9,583,011 B2 | 2/2017 | Ott | |
| 2013/0080839 A1 * | 3/2013 | Gin | G06F 11/366 714/E11.212 |

(Continued)

FOREIGN PATENT DOCUMENTS

| | | |
|---|---|---|
| FR | 3 014 233 B1 | 12/2020 |
| KR | 10-1924872 B1 | 12/2018 |

OTHER PUBLICATIONS

Roth et al., "Database Management: The Heart of Integrated Avionics," IEEE Xplore, ieeexplore.ieee.org, 1993, pp. 535-541. (Year: 1993).*

(Continued)

*Primary Examiner* — Cheryl Lewis
(74) *Attorney, Agent, or Firm* — BakerHostetler

(57) ABSTRACT

An apparatus and a method allowing a pilot or more generally a crew to enrich a database of user obstacles directly inside the aircraft, on the ground and even during flight. Generally, the apparatus is based on a new software component, which allows new services to be provided for the functional avionic components and for the human machine interfaces HMI of the avionics. This new software component is configured to allow: user obstacles to be created, changed, deleted at the request of components of HMIs of the avionics; user obstacles to be sent to clients of the services of this new software component, which are either other functional components of the avionics or other components of HMIs of the avionics; user obstacles to be recorded to a nonvolatile memory and restored from this nonvolatile memory.

17 Claims, 5 Drawing Sheets

(56) References Cited

U.S. PATENT DOCUMENTS

| | | | |
|---|---|---|---|
| 2015/0045989 A1* | 2/2015 | Polansky | G01C 23/00 |
| | | | 701/2 |
| 2016/0103217 A1* | 4/2016 | Samuthirapandian | G01S 7/22 |
| | | | 701/301 |
| 2016/0217696 A1 | 7/2016 | Ott | |
| 2017/0148329 A1* | 5/2017 | Cornell | G08G 5/0021 |
| 2018/0050815 A1* | 2/2018 | Kathirvel | G06T 11/60 |

OTHER PUBLICATIONS

Loyall et al., "Impact Analysis And Change Management For Avionics Software," IEEE Xplore, ieeexplore.ieee.org, 1997, pp. 740-747. (Year: 1997).*

"AgMission Operations Manual", AG-NAV Inc, 2021.

Fayollas, et al., "Interactive cockpits as critical applications: a model-based and a fault-tolerant approach", International Journal of Critical Computer-Based Systems, vol. 4, No. 3, 2013.

\* cited by examiner

METHOD AND APPARATUS FOR UPDATING AND SHARING AN OBSTACLE DATABASE FOR AIRCRAFT

CROSS-REFERENCE TO RELATED APPLICATION

This application claims priority to foreign French patent application No. FR 2106771, filed on Jun. 24, 2022, the disclosure of which is incorporated by reference in its entirety.

FIELD OF THE INVENTION

The invention concerns the technical field of display systems on aircraft flight decks and relates more particularly to an apparatus and a method for storing and sharing geometric georeferenced data created during a mission, in particular data of user obstacle type created during an aeronautical mission.

BACKGROUND

Appendix 4 of the Convention on the International Civil Aviation Organization (ICAO), which relates to aeronautical charts, defines an "obstacle" as being "all or part of a fixed (temporary or permanent) or mobile object that:
- is situated in an area intended for the movement of aircraft on the surface; or
- projects above a defined surface intended to protect aircraft in flight; or
- is located outside such a defined surface and is judged to be a hazard for air navigation".

Such obstacles, which are also referred to as "significant obstacles", are included on aeronautical charts. Each obstacle is represented on a chart as an "obstacle entity" by an appropriate conventional sign and an appropriate identifier. The obstacle entities shown on a chart are related to the attributes present in an obstacle database, such as:
- the horizontal position in geographical coordinates and the associated altitude;
- the type of the obstacle;
- the extension of the obstacle, if necessary.

The obstacle data attributes present in an obstacle database, for example the "Digital Obstacle File" (DOF) of the "Federal Aviation Administration", are instances of entities that may be represented by dots, lines or polygons. An obstacle representation example for a pylon may be a dot. An obstacle presentation example for a high-voltage electrical line may be lines. An obstacle representation example for a building may be a polygon.

Such obstacles may become a threat for aircraft flying close to the ground, and in particular for helicopters when visibility is low, even under VFR ("Visual Flight Rules") conditions.

Modern cockpits are able to provide solutions to improve awareness of the situation for pilots as regards obstacles.

The prior art regarding functions of obstacles relates only to functions that use obstacle data provided by an official supplier of aeronautical data, but without any means of personalization. These functions are 2D display on a digital chart, 3D display on a synthetic vision system (SVS), or an obstacle warning system using for example a terrain awareness and warning system (TAWS).

A solution from the company "AG-NAV" consists of an onboard GPS device called "Guia", with a touchscreen that allows navigation data and aerial spraying mission data to be displayed in the cockpit on a mobile chart. This solution uses an Internet application called "AgMission" to prepare for an aerial spraying mission, and also allows an operator to insert user obstacles by clicking directly on a location on a digital chart, entering its height, and then recording the obstacles and exporting them to Guia via a file. The Guia solution thus allows user obstacle files created via the AgMission application to be downloaded. It also allows official obstacle databases such as the FAA's DOF to be downloaded, these obstacles to then be displayed in different colours, depending on their height, on a digital chart of the touchscreen, and the pilot to be warned when the flies too close to an obstacle.

However, the AgMission solution requires the use of an Internet site to create new obstacles, and then a transfer via a computer file to the Guia GPS peripherals. Moreover, these obstacles are not integrated in the avionics, within the context of certified avionic systems. They therefore cannot be used as obstacles of an official obstacle database in order to feed an SVS or indeed a TAWS or an HTAWS.

Mention may also be made of the patents FR 3 014 233 B1 and U.S. Pat. No. 9,583,011 B2 from Airbus Helicopter, which describe aircraft systems allowing indication of the presence of obstacles and also obstacle detection methods. These obstacle warning systems are based on the use of an onboard database that may be updated during flight (by adding and deleting obstacles manually), with means to then confirm the updates to the ground. However, no descriptive element is provided as regards the performance of a function that allows "user obstacles" to be created with an implementation in certified avionics.

The solutions to improve awareness of the situation for pilots as regards obstacles require there to be an obstacle database that is precise and complete in the operating area of the aircraft. Such a base exists only rarely, however, and obstacle databases are highly heterogeneous depending on the countries or depending on the areas inside the countries.

Even if the FAA keeps a database, the DOF, which is complete and precise over the entire territory in the USA, very few countries do so, and generally only obstacles around airports are correctly referenced in aeronautical databases.

Moreover, helicopter pilots may want their obstacle database to have new constructions (antennas, wind turbines, etc.) that are not yet recorded in official databases, to have temporary obstacles such as cranes or structures related to an event or else to have individual obstacles from a group of obstacles that are recorded as a group only in official databases.

However, no solution for an avionic function or for an EFB application relating to a "user obstacle" function has been identified to date that allows an official obstacle database to be created during flight and enriched directly in the cockpit without giving rise to the aforementioned disadvantages.

There is therefore a need for a solution for enriching an obstacle database during flight or in the cockpit.

Moreover, the directive for the development of aircraft and civil systems relating to safety aspects (aerospace recommended practice ARP) requires the processes used during product development to be consistent with the standard process ARP4754. This standard deals with development processes that support aeronautical systems certification, addressing "the complete development cycle for aircraft, on the basis of system demands due to system verification".

Furthermore, the development of electronic subsystems and the development of software for aeronautical systems need to be consistent with the demands of processes of DO254 and DO178B, respectively.

DO254 ("Design Assurance Guidance for Airborne Electronic Hardware") specifies development constraints for the purposes of obtaining the certification for an electronic avionic device.

DO178B ("Software Considerations in Airborne Systems and Equipment Certification") relates to safety of the software used in certain airborne systems and indicates development constraints for the purposes of obtaining the certification for avionic software.

It is known that various levels of criticality or (DAL), for "Design Assurance Level", are attributed to various software functions or hardware systems, depending on fault conditions and the associated risks. The greater the potential impact of a fault in a component, the safer said component needs to be. DALs are used to determine the level of requirement that needs to be applied to the various components (hardware and software components) of an avionic system.

Five DAL levels (from A to E) are defined:
- level A (catastrophic): a fault in the system or subsystem being studied may cause a catastrophic problem (safety of the flight, compromised landing, the airplane crashing);
- level B (very serious): a fault in the system or subsystem being studied may cause a major problem leading to serious damage or even the death of some occupants;
- level C (serious): a fault in the system or subsystem being studied may cause a serious problem leading to a malfunction in vital equipment of the aircraft;
- level D (minor): a fault in the system or subsystem being studied may cause a problem that can disrupt the safety of the flight;
- level E (no effect): a fault in the system or subsystem being studied may cause a problem that does not affect the safety of the flight.

In view of the demands concerning the development of hardware and software components, any solution for enriching an obstacle database during flight or in the cockpit must comply with the development process DAL.

The present invention meets this requirement.

SUMMARY OF THE INVENTION

The invention aims to compensate for the lack of obstacle data in databases for helicopters or other aircraft that fly very often under VFR conditions, close to the ground and outside of airport areas.

The present invention allows pilots themselves to enrich obstacle databases with new obstacles, directly during flight or when preparing for a mission, in their area of interest.

These new obstacles, which are each referred to as a "user obstacle", become available in avionic functions in the same way as the obstacle data provided by suppliers of aeronautical databases.

By virtue of the present invention, a user obstacle may be displayed on a 2D view of a digital mobile chart or a navigation display, on a 3D view of a main flight display SVS, or it may feed a terrain awareness and warning system (for example TAWS).

An object of the present invention is an apparatus comprising means allowing a pilot or more particularly a crew to enrich an obstacle database directly inside the aircraft, on the ground and even during flight.

Generally, the apparatus of the invention is based on a new software component called "GGS", the abbreviation GGS denoting "geometric georeferenced shapes".

The present invention responds to the DAL development process, and proposes this new software component whose level of criticality is at least equal to the highest level of criticality among the different levels of criticality of the different functional chains to which this software component will contribute.

This new GGS software component is configured to provide new services for the avionic functional components and for the human-machine interfaces (HMI) of the avionics, which are collectively referred to as avionic components.

In a preferred application, the GGS software component is configured to manage user obstacles.

This new GGS software component is configured to allow:
- user obstacles to be created, changed, deleted at the request of components of HMIs of the avionics;
- user obstacles to be shared (sent) with clients of this new GGS software component, which are either other functional components of the avionics or other components of HMIs of the avionics;
- user obstacles to be recorded to a nonvolatile memory and restored from this nonvolatile memory.

This software avionic component is implemented in a display unit or DU of the avionics and is dedicated to sharing and storing user obstacles (GGS).

The GGS software component and its clients may be accommodated on one and the same display unit DU; they may also be accommodated on different display units in a multi-DU cockpit configuration.

The reason is that, in an alternative embodiment, the GGS software component may also be replicated on multiple display units DUs, with one DU accommodating a GGS software component operating as the master and one or more secondary DUs accommodating a GGS software component operating as a slave.

Advantageously, the proposed solution upholds the principles of segregation of the memory of the aeronautical software components, where a single component may write to a shared memory that may be read by multiple components. Thus, the GGS software component may read and write from/to a volatile memory shared between the aeronautical software components of one and the same device accommodating the GGS component, and it is the only one to have the authorization to write to this memory.

In order to obtain the desired results, what is proposed is a method for enriching and sharing a database of user obstacles aboard an aircraft, the aircraft comprising multiple avionic devices connected by a communication network, each avionic device accommodating at least one avionic component capable of using the database of user obstacles, one device accommodating a GGS software component configured to implement the steps of:
- loading a database of user obstacles that is stored in a nonvolatile memory of said master avionic device, said user obstacles being obstacles that are not listed in the aircraft's obstacle database;
- copying the database of user obstacles to an area of a volatile memory of said master avionic device, the volatile memory being a memory shared among multiple avionic components capable of using the database of user obstacles; notifying each avionic component of the master device of the availability of the database of user obstacles in the volatile memory;

sending the database of user obstacles to the other avionic devices accommodating a GGS software component, each other device being a slave device accommodating a slave GGS software component configured to:
receive the database of user obstacles that is sent by the master device;
copy the database of user obstacles to an area of a volatile memory, said volatile memory being a memory shared among the avionic components of the slave device that are capable of using the database of user obstacles; and
notifying each avionic component of the availability of the database of user obstacles in the volatile memory.

According to alternative or combined embodiments:
the method comprises a step of copying the database of user obstacles to a nonvolatile memory of an avionic device accommodating a slave GGS software component.
the method comprises the steps of:
receiving on the device accommodating the master GGS software component a request to change the database of user obstacles, the request being transmitted in order to create and/or change and/or delete a user obstacle;
processing the request in shared volatile memory of said device, the processing of the request causing the database of user obstacles to be updated;
recording the update of the database of user obstacles in the nonvolatile memory of said device; and
notifying each avionic component of the availability of the database of user obstacles in the volatile memory of the avionic device accommodating it.
the method further comprises, after the step of processing the request, the steps of:
sending the database of georeferenced user obstacles to the avionic devices accommodating a slave GGS software component;
copying the database of georeferenced user obstacles to an area of the volatile memory of each avionic device accommodating a slave GGS software component; and
notifying each avionic component of the availability of the database of user obstacles in the volatile memory of the avionic device accommodating it.
the method comprises, after the step of processing the request, the step of copying the database of user obstacles to the nonvolatile memory of said avionic device accommodating a slave GGS software component.
the method comprises, before the step of receiving on the avionic device accommodating the master GGS software component a request to change the database of user obstacles, the steps of:
transmitting, by way of an avionic device accommodating a slave GGS software component, a request to change the database of user obstacles; and
sending said request to the avionic device accommodating a master GGS software component.

The invention also relates to a computer program product comprising code instructions allowing the steps of the method according to the invention to be carried out when the program is executed on a computer.

The invention further relates to an apparatus comprising means for implementing the steps of the method of the invention.

According to alternative or combined embodiments:
the avionic devices are visual display devices capable of displaying the user obstacles.
the visual display device is a head-down screen in the cockpit that is able to display the flying and/or navigation parameters of the aircraft.
the visual display device is a head-up screen in the cockpit, which is or is not worn on the head of the pilot, that is able to display the flying parameters of the aircraft.
the apparatus comprises at least one human-machine interface component that allows a request to create, change or delete at least one user obstacle to be sent.
the human-machine interface component is a 2-dimensional mapping system that is displayed on a head-down screen in the cockpit and is able to display the navigation parameters of the aircraft, or is a real-world-consistent designation system displayed on a head-up screen in the cockpit that is or is not worn on the head of the pilot.
the avionic components comprise at least one functional component configured to perform warning computations.
said at least one functional component is a terrain awareness and warning system TAWS.
the avionic components comprise at least one HMI component of 2-dimensional mapping system type that allows display on a head-down screen in the cockpit and is able to display the navigation parameters of the aircraft, or a 3-dimensional synthetic vision system SVS that allows display on a head-down or head-up screen in the cockpit and is able to display the flying parameters of the aircraft.

The invention also addresses the use of the apparatus of the invention in an aircraft cockpit comprising avionic devices configured to carry out the method of the invention.

BRIEF DESCRIPTION OF THE DRAWINGS

Other features and advantages of the invention will emerge from the description that follows and the figures of the appended drawings, in which.

DETAILED DESCRIPTION

The description of the invention is provided using the example of a database of user obstacles created during an aeronautical mission.

Figure 1:
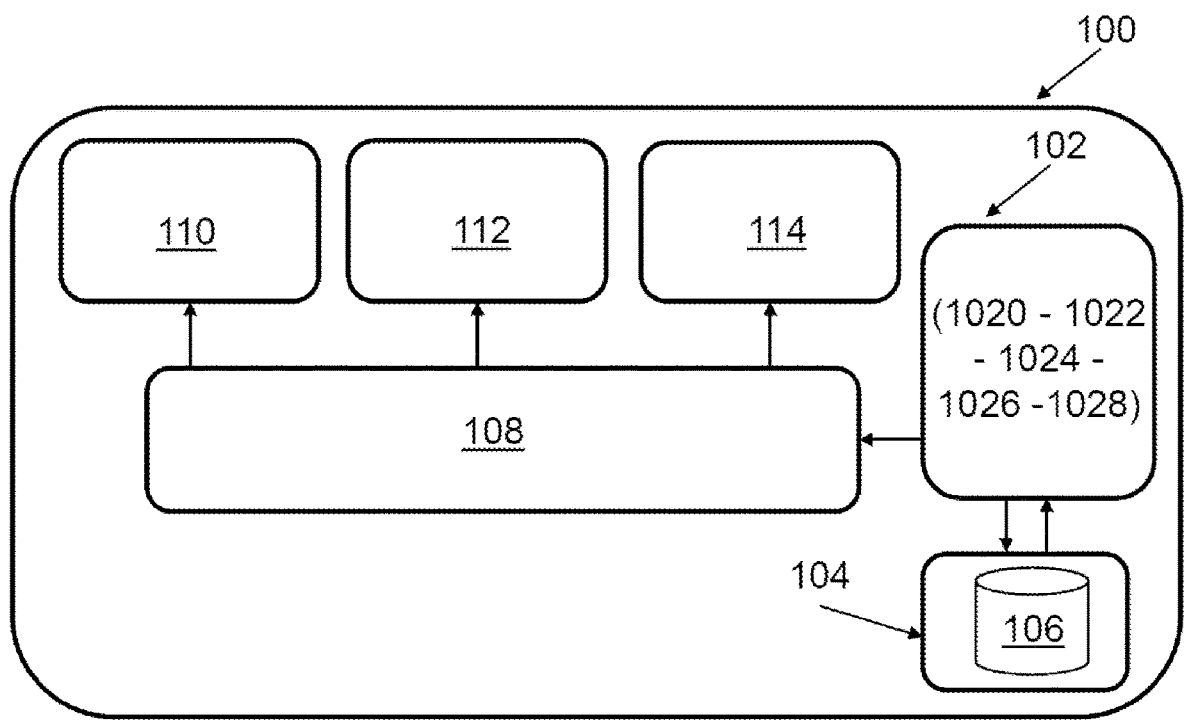
FIG. 1 is a block diagram to illustrate an implementation of an avionic device according to the invention.

The method of the invention is based on the implementation of a software component (102), called "GGS", that is installed in an avionic device (100) as illustrated in FIG. 1. Avionic devices within the context of the present description may be in particular head-down visual display screens (for visually displaying parameters of the flight) (HDD), head-up display systems, either worn (HWD) or not worn (HUD), or else computers.

The general principle is that the GGS software component (102) allows, on initialization of the avionic device (100)

accommodating it, a database of user obstacles (106) that is stored in a nonvolatile memory (104) of this device to be loaded into an area of a volatile memory (108) shared among the software components of this device that potentially use the obstacle database.

The user obstacles within the context of the invention are obstacles that have been created and defined by the users (pilot; co-pilot) of the aircraft and that are not integrated in the obstacle database of the aircraft (i.e. the onboard base containing the obstacle data provided by an official supplier of aeronautical data).

FIG. 1 schematically illustrates an avionic device (100) comprising multiple known functional avionic components (110, 112, 114), a GGS software component (102) according to the invention, a volatile memory (108) shared among all of the functional avionic components (110, 112, 114) and the GGS software component (102), and a database of user obstacles (106) that is stored in a nonvolatile memory (or mass memory 104) of this device.

For reasons of simplification but not of limitation, three types of functional avionic components are illustrated for the device (100) comprising a synthetic vision system (SVS) (110), a 2D mapping system (112) and a terrain awareness and warning system (TAWS) (114), which are components providing current functions in an aircraft cockpit.

Generally, the GGS software component of the invention (102) is configured to at least:
- load (1020) a database of user obstacles (106) from a nonvolatile memory (104) of an avionic device accommodating it into an area of a volatile memory (108) shared among the software components accommodated by said device that potentially use the obstacle database, the user obstacles being obstacles that are not listed in the aircraft's obstacle database provided by an official supplier;
- create and/or change and/or delete (1022) at least one user obstacle in the database of user obstacles in the shared volatile memory of said avionic device;
- exchange (1024) all or part of the database of user obstacles with the various instances of the GGS software component that are accommodated on other avionic devices aboard the aircraft, which are visual display devices capable of displaying said user obstacles and/or which are devices capable of implementing functions for handling said user obstacles;
- notifying (1026) avionic components on the same device accommodating them;
- storing (1028) a version of the database of user obstacles in nonvolatile memory of avionic visual display devices and/or avionic user devices.

The present invention upholds the principles of segregation of the memory of the aeronautical software components, in that a single software component is authorized to write to the database of user obstacles when it has been loaded into the shared volatile memory (108). All of the components (102, 110, 112, 114) may read from the shared volatile memory, but only the GGS software component may write and allow it to be updated (user obstacles to be added, deleted or changed).

Therefore, so as to prevent another component of the avionic device (100) from effecting read access to the database of user obstacles while it is being updated, the apparatus of the invention (102) works with a double-buffer system or buffer memory with the shared volatile memory by providing two independently accessible parts. The double buffer allows the GGS software component to be able to effect write access to the database of user obstacles in a first part of the double buffer, and allows the other components (110, 112, 114) of the device, such as the SVS, the 2D mapping or the TAWS function, along with itself (for the purposes of sending and/or storage in nonvolatile memory) to read the database of user obstacles in the other part of the double buffer. When the GGS software component (102) has finished its update in the first part of the double buffer, a notification is transmitted to the other components of the device that are able to read the database of user obstacles, in order to indicate to them that the up-to-date database needs to be read in the first part of the buffer from now on. The GGS software component (102) may thus start the next update of the database in the second part of the double buffer after having received confirmation of reception of the notification from each of the reading components.

Figure 2:
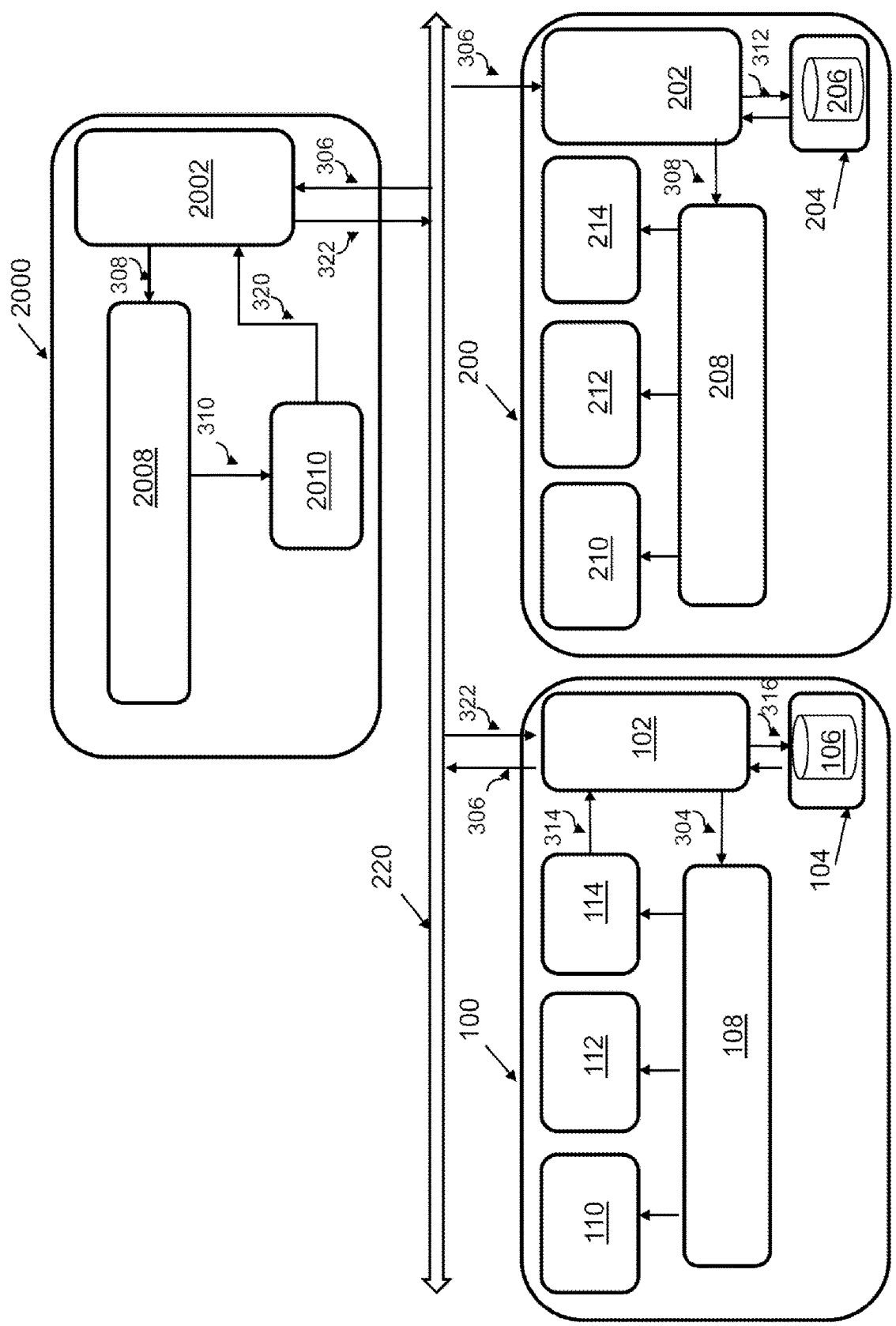
FIG. 2 is a block diagram to illustrate an operational implementation of the invention in an aeronautical environment, in particular an aircraft cockpit, comprising multiple avionic devices.

FIG. 2 illustrates an operational implementation of the invention in an aeronautical environment, in particular an aircraft cockpit, comprising multiple avionic devices connected to one another by a computer communication network.

For reasons of simplification but not of limitation, the example is based on an avionic context having three avionic devices (100, 200, 2000) connected by a computer communication network (220).

A first device (100) is illustrated as being identical to that in FIG. 1 and bears the same references (however, a person skilled in the art may make changes to the number and nature of the standard (functional and HMI) avionic components 110, 112, 114).

The first device (100) accommodating the GGS software component (102) and the database of user obstacles (106) is defined as being a master device comprising a GGS software component (102) referred to as 'master GGS'.

A second avionic device (200) comprises one or more functional avionic components (210, 212, 214), a GGS software component (202) and a volatile memory (208) shared among all of the components (202, 210, 212, 214). The GGS software component (202) of the second device is referred to as a 'slave GGS' because it does not have all of the prerogatives of the master GGS software component, which is the only one to be able to write to the database of user obstacles. The second device is defined as being a slave device.

A third device (2000) is illustrated as comprising a single functional avionic component (2010), a GGS software component (2002) and a volatile memory (2008) shared among all of the components (2002, 2010). The GGS software component (2002) of the third device is referred to as a 'slave GGS' because it does not have all of the prerogatives of the master GGS software component, which is the only one to be able to write to the database of user obstacles. The third device is defined as being a slave device.

The avionic devices likely to use the database of user obstacles may for example be a large head-down display screen (HDD) that is able to use one part of the screen to display 2D mapping showing the user obstacles, and to use another part of the screen to display a synthetic vision system (SVS) showing these user obstacles in 3D. This same device may also accommodate a functional component TAWS, which will use the database of user obstacles to compute warnings if the aircraft is about to fly too close to one of these obstacles.

Another device may be a head-up screen that is able to display the user obstacles in 3D consistently, that is to say by virtue of their being superimposed on real obstacles.

When the avionic device (100) that accommodates the master GGS software component (102) is initialized, the latter may use the network (220) connecting the devices to send the database of user obstacles (106) (i.e. the content of the base) to all other slave GGS software components of the other avionic devices in the cockpit that are likely to use this obstacle database, either to display these obstacles or for computations (typically warning computations).

Thus, the second device (200) may receive, via the slave GGS software component that it accommodates, the data of the database of user obstacles (106), which are then loaded into the shared volatile memory (208) of its device (200). Similarly, the third device (2000) may receive, via the slave GGS software component (2002) that it accommodates, the data of the database of user obstacles (106), which are then loaded into the shared volatile memory (2008) of its device (2000).

In a variant embodiment (illustrated on the device 200), so as to make the "user obstacles" function tolerant to breakdown of the device accommodating the master GGS software component, a slave GGS software component accommodated on one of the secondary devices may become master GGS. For this purpose, the slave GGS software component is responsible for keeping the database of user obstacles in an area of its nonvolatile memory (204) up to date. Thus, if the primary device accommodating the master GGS software component (102) breaks down, the slave GGS software component (202) becomes the master and the "user obstacles" function continues to work without loss of data on the remaining devices.

Such a configuration allows the reliability of the system to be improved, because if the display unit accommodating the master GGS software component is lost, a slave GGS software component that has made a copy of the database of user obstacles may become the new master GGS software component, and the GGS services may then be continued without loss of data.

Thus, whatever the number of devices, an instance of the GGS software component may be executed on each device, with one of the GGS software components acting as master on a master device and the other GGS instances acting as slave GGS software components on slave devices. Only the master GGS instance is authorized to update the database of user obstacles.

The master GGS software component uses the (wired or wireless) network to send the last version of the database to the slave GGS modules that are responsible for copying it to the double buffer of the shared volatile memory of their device (according to the principle described earlier on).

In the case of a device having a multicore processor, an implementation with one double buffer per core is preferable in order to prevent one core from being blocked by another core when the shared volatile memory is simultaneously read by multiple cores.

Figure 3A:
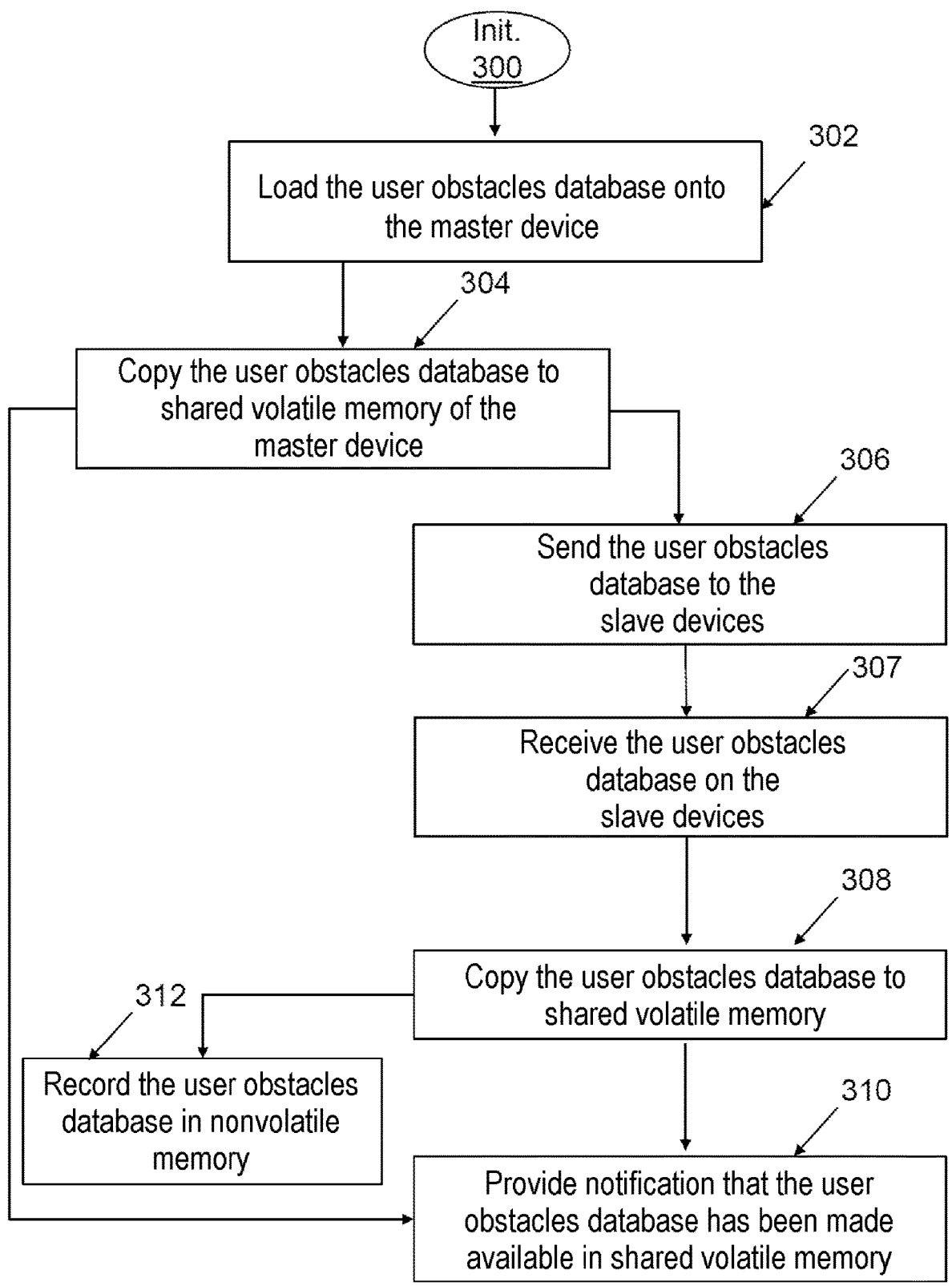
FIG. 3a, FIG. 3b, FIG. 3c are flowcharts of the basic steps for enriching and sharing a database of user obstacles according to the invention.
Figure 3B:
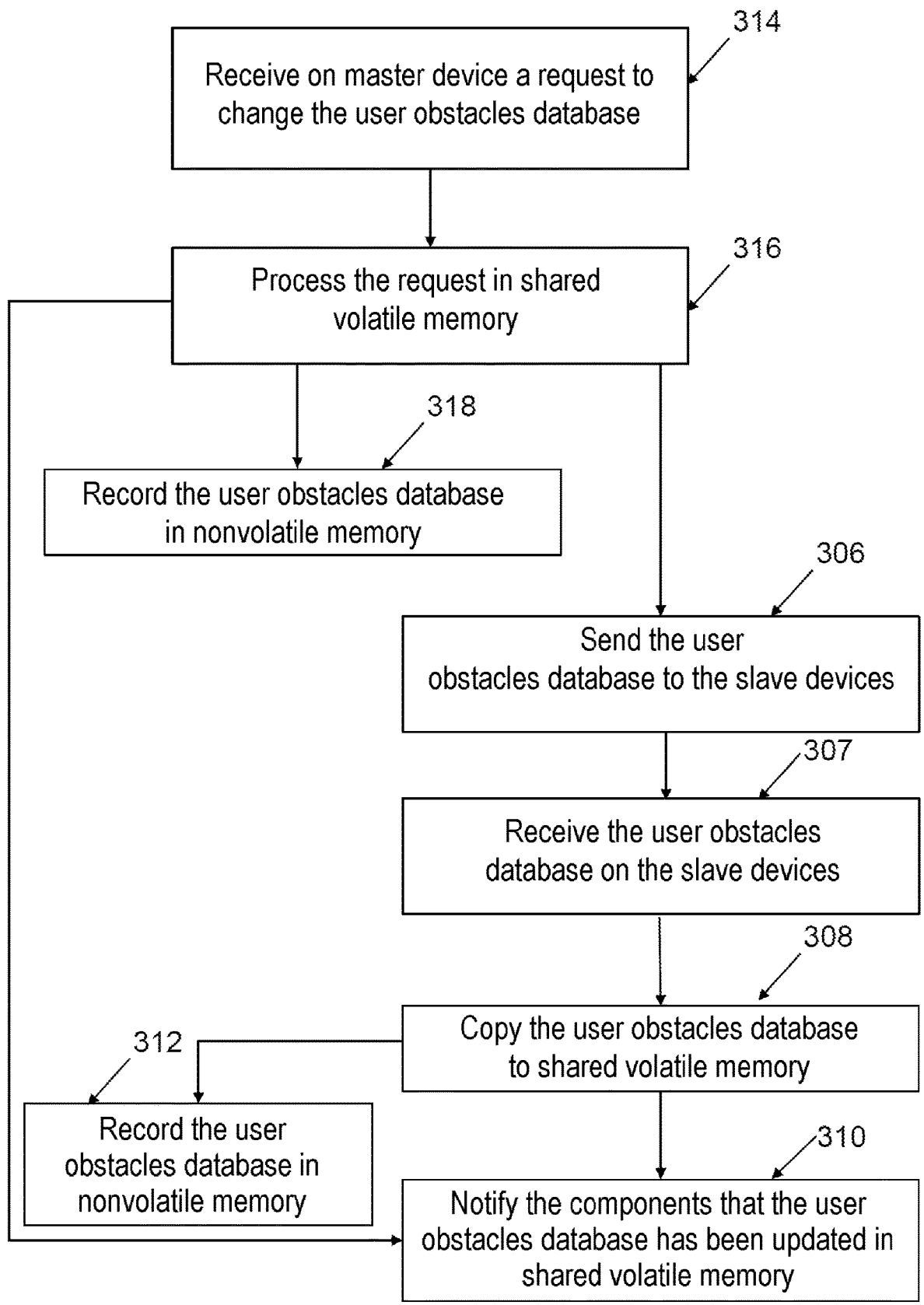
Figure 3C:
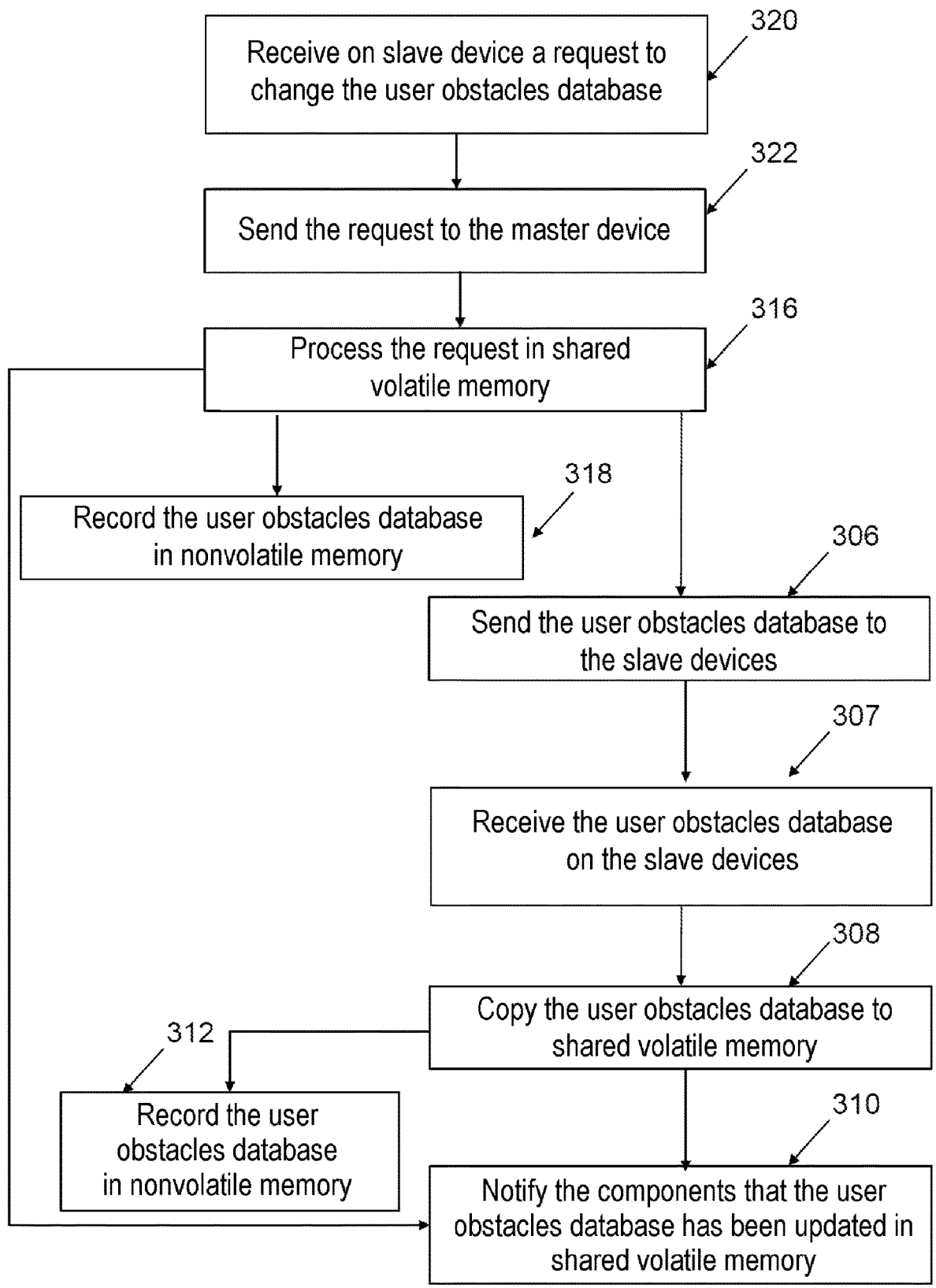

FIGS. 3*a* to 3*c* use flowcharts to illustrate the main steps of implementation of the invention for enriching and sharing a database of user obstacles.

Within the context of the invention, an aircraft user, i.e. the pilot or the co-pilot, may change the database of user obstacles from his cockpit, either during flight or on the ground while preparing for the mission prior to take-off, by way of a human-machine interface (HMI) component accommodated on one of the avionic devices in the cockpit.

The HMI component for accessing the functions for changing the database of user obstacles may be for example a 2-dimensional mapping system displayed on a head-down screen in the cockpit or else a real-world-consistent designation system displayed on a head-up screen in the cockpit, which is or is not worn on the head of the pilot.

The patent application entitled "Method and apparatus for enriching an obstacle database for aircraft" from the Applicant, which was filed on the same date, describes such a method for changing a database of user obstacles.

When a device accommodating a master GGS module is initialized, the method as illustrated in FIG. 3*a* (and FIG. 2) allows the database of user obstacles to be loaded (302) onto the master device, and then the current version of the database to be copied (304) to an area of the shared volatile memory of this device (for sharing among the various components of this device that use the database). The method then allows the (functional and HMI) avionic components of the device to be notified (310) that the database of user obstacles has been made available.

The method of initialization also allows the computer communication network to be used, after the database has been copied to shared volatile memory, to send (306) the database to the other slave devices having a slave GGS software component.

The method then continues with steps carried out locally on each slave device. Thus, each slave device is configured to receive (307) the database of user obstacles. The local initialization method then allows each slave GGS software component to copy (308) the database of user obstacles to an area of the shared volatile memory of the device accommodating it, and then allows the (functional and HMI) avionic components of the device to be notified (310) that the database of user obstacles has been made available.

In an implementation with redundancy, where a copy of the database of user obstacles is stored in nonvolatile memory on a slave device, the local method allows the slave GGS of this device to record (312) the received version of the database in nonvolatile memory.

Thus, at the end of the initialization method (300), each device having avionic components that use GGS services has the last version of the database of user obstacles in volatile memory.

FIG. 3*b* (and FIG. 2) illustrates the main steps of the processing of a request to change the database of user obstacles that is transmitted via an avionic component of the device accommodating the master GGS module. A change request within the context of the invention is a request to access the database in order to create or change or delete at least one user obstacle.

In a first step, the method allows the master GGS module to receive (314) a request to access the database of user obstacles on the basis of an interaction by a user with an HMI of an avionic component having a function for creating, changing and deleting user obstacles.

The master GGS software component is configured to process (316) the request in the shared volatile memory of its device according to the double-buffer principle described and to notify (310) the (functional and HMI) avionic components of the device that the database has been updated.

The method then allows the updated database to be recorded (318) in nonvolatile memory of the master device. In parallel, the method allows the update of the database to be sent (306) to the various slave devices. The method then continues with steps 306 to 310, which were described earlier on and are carried out locally on each slave device. Thus, the method allows a slave device to receive (307) the database, then allows the slave module to copy (308) the update of the database to shared volatile memory and to notify (310) the (functional and HMI) avionic components of the device that the database has been made available.

In a configuration of a slave device with redundancy, the method allows the update to be recorded (312) locally in nonvolatile redundancy memory.

The notification sent by the master and slave GGS modules to the (functional and HMI) avionic components of their device allows announcement that the initial version or the current updated version of the database has been made available and indication of what part of the double buffer should be used.

Thus, at the end of the method for processing an update request transmitted from the device accommodating the master GGS module, each device having avionic components that use GGS services has the last version of the database of user obstacles in volatile memory.

The method for processing a request differs when the request is transmitted from a component of a slave device accommodating a slave GGS module as illustrated in FIG. 3*c*. Steps similar to those of the method in FIG. 3*b* bear the same references.

Thus, when a request to access the database of user obstacles is transmitted via an HMI by an avionic component having a function for changing user obstacles, which is accommodated on a slave device, the slave GGS module of this device that receives (320) the request forwards it (322), via the device interconnection network, to the master device. The method then continues with the various steps consistent with FIG. 3*b* in order to process (316) the request in the volatile memory of the master device and to carry out the various recordings of the update (306, 307, 308, 312, 318) and various notifications for the components (310).

Thus, at the end of the method for processing an update request transmitted from a device accommodating a slave GGS module, each device having avionic components that use GGS services has the last version of the database of user obstacles in volatile memory.

In one embodiment, an HMI component that is used to request that user obstacles be changed is configured to display the created or changed obstacles in a distinctive state of the existing user obstacles until the database is updated and shared by the GGS software component. On receiving the new database of user obstacles, the HMI component allows these obstacles to be displayed in the same state as the existing user obstacles.

A person skilled in the art will understand that only the main steps of the method are described so as to illustrate the general principle of the invention.

A description has thus been provided of methods based on the use of a new software component, called GGS, that is accommodated on the devices in an aircraft cockpit, this component being able to create new obstacles (user obstacles) according to instructions originating from an HMI module situated on the same device or on another. A single GGS software component, which is unique in the cockpit, and referred to as the master GGS, is responsible for storing the user obstacles (or geometric georeferenced shapes) and sharing them with firstly all software components of the same device that are capable of displaying and/or processing these user obstacles and secondly all other GGS software components in the cockpit, referred to as slave GGSs, each on a distinct device, the latter themselves being responsible for sharing the user obstacles with the software components of their device that are capable of displaying and/or processing these user obstacles. The proposed solution takes account of and meets the constraints of memory segregation and the reliability demands characteristic of certified onboard aeronautical systems.

The invention claimed is:

1. A method for enriching and sharing a database of user obstacles aboard an aircraft, the aircraft comprising multiple avionic devices connected by a communication network, certain avionic devices accommodating at least one avionic component capable of using the database of user obstacles and a software component, one of these devices, referred to as the master device, accommodating a software component, defined as the master software component, configured to implement the steps of:

loading a database of user obstacles that is stored in a nonvolatile memory of said master avionic device, said user obstacles being obstacles that are not listed in the aircraft's obstacle database;

copying the database of user obstacles to an area of a volatile memory of said master avionic device, the volatile memory being a memory shared among multiple avionic components capable of using the database of user obstacles;

notifying each avionic component of the master device of the availability of the database of user obstacles in the volatile memory;

sending the database of user obstacles to the other avionic devices accommodating a software component, each other device being a slave device accommodating a slave software component configured to:

receive the database of user obstacles that is sent by the master device;

copy the database of user obstacles to an area of a volatile memory, said volatile memory being a memory shared among the avionic components of the slave device that are capable of using the database of user obstacles; and notifying each avionic component of the availability of the database of user obstacles in the volatile memory.

2. The method according to claim 1, further comprising, after the step of receiving the database of user obstacles on a slave device, a step of recording the database in a nonvolatile memory of said slave device so as to be able to activate the slave software component as the master software component if the master software component breaks down.

3. The method according to claim 1, further comprising steps of:

receiving on the master device a request to change the database of user obstacles, the request being transmitted in order to create and/or change and/or delete a user obstacle;

processing the request in shared volatile memory of said master device, the processing of the request causing the database of user obstacles to be updated;

recording the update of the database of user obstacles in the nonvolatile memory of said master device;

notifying each avionic component of said master device that the database of user obstacles has been updated in the volatile memory.

4. The method according to claim 3, further comprising, after the step of processing the request, steps of:

sending the database of user obstacles to the other avionic devices accommodating a software component, each other device being a slave device accommodating a slave software component configured to:

receive the database of user obstacles that is sent by the master device;

copy the database of user obstacles to an area of a volatile memory, said volatile memory being a memory shared among the avionic components of the slave device that are capable of using the database of user obstacles; and notifying each avionic component of the availability of the database of user obstacles in the volatile memory.

5. The method according to claim 4, further comprising, after the step of receiving the database of user obstacles on a slave device, a step of recording the database in a non-volatile memory of said slave device so as to be able to activate the slave software component as the master software component if the master software component breaks down.

6. The method according to claim 3, comprising, before the step of receiving on the master device a request to change the database of user obstacles, steps of:
   receiving on a slave device a request to change the database of user obstacles, the request being transmitted in order to create and/or change and/or delete a user obstacle;
   sending said request to the master device.

7. A computer program product, said computer program comprising code instructions allowing the steps of the method according to claim 1 to be carried out when said program is executed on a computer.

8. An apparatus for enriching and sharing a database of user obstacles aboard an aircraft, the aircraft comprising multiple avionic devices connected by a communication network, each avionic device accommodating at least one avionic component capable of using the database of user obstacles and a software component, the apparatus comprising means for implementing the steps of the method according to claim 1.

9. The apparatus according to claim 8, wherein the avionic devices are visual display devices capable of displaying the user obstacles.

10. The apparatus according to claim 9, wherein the visual display device is a head-down screen in the cockpit that allows the flying and/or navigation parameters of the aircraft to be displayed.

11. An aircraft cockpit comprising an apparatus according to claim 8.

12. The apparatus according to claim 9, wherein the visual display device is a head-up screen in the cockpit, which is or is not worn on the head of the pilot, that is able to display the flying parameters of the aircraft.

13. The apparatus according to claim 9, wherein the avionic components comprise at least one functional component configured to perform warning computations.

14. The apparatus according to claim 13, wherein said at least one functional component is a terrain awareness and warning system TAWS.

15. The apparatus according to claim 1, comprising at least one human-machine interface component that allows a request to create, change or delete at least one user obstacle to be sent.

16. The apparatus according to claim 15, wherein the human-machine interface component is a 2-dimensional mapping system that is displayed on a head-down screen in the cockpit and is able to display the navigation parameters of the aircraft, or is a real-world-consistent designation system displayed on a head-up screen in the cockpit that is or is not worn on the head of the pilot.

17. The apparatus according to claim 1, wherein the avionic components comprise at least one HMI component of 2-dimensional mapping system type that allows display on a head-down screen in the cockpit and is able to display the navigation parameters of the aircraft, or a 3-dimensional synthetic vision system SVS that allows display on a head-down or head-up screen in the cockpit and is able to display the flying parameters of the aircraft.

* * * * *